(12) United States Patent
Dang et al.

(10) Patent No.: US 9,360,953 B2
(45) Date of Patent: Jun. 7, 2016

(54) METHOD AND SYSTEM FOR UNLOCKING A DEVICE HAVING A TOUCH SCREEN

(71) Applicant: BEIJING NETQIN TECHNOLOGY CO., LTD., Beijing (CN)

(72) Inventors: Jinfeng Dang, Beijing (CN); Feng Li, Beijing (CN); Yu Lin, Beijing (CN); Shihong Zou, Beijing (CN)

(73) Assignee: Beijing Netqin Technology Co., Ltd., Beijing (CN)

( * ) Notice: Subject to any disclaimer, the term of this patent is extended or adjusted under 35 U.S.C. 154(b) by 0 days.

(21) Appl. No.: 14/129,732

(22) PCT Filed: Oct. 19, 2012

(86) PCT No.: PCT/CN2012/083217
§ 371 (c)(1),
(2) Date: Dec. 27, 2013

(87) PCT Pub. No.: WO2013/056673
PCT Pub. Date: Apr. 25, 2013

(65) Prior Publication Data
US 2014/0176468 A1      Jun. 26, 2014

(30) Foreign Application Priority Data

Oct. 20, 2011   (CN) .......................... 2011 1 0319527

(51) Int. Cl.
*G06F 3/041*      (2006.01)
*G06F 3/0488*    (2013.01)
*G06F 21/36*     (2013.01)

(52) U.S. Cl.
CPC ............ *G06F 3/041* (2013.01); *G06F 3/04883* (2013.01); *G06F 21/36* (2013.01)

(58) Field of Classification Search
USPC ..................... 345/173–174; 340/5.54; 705/44
See application file for complete search history.

(56) References Cited

U.S. PATENT DOCUMENTS

| | | | |
|---|---|---|---|
| 7,997,503 B2 * | 8/2011 | Walker .......................... | 235/494 |
| 8,392,986 B1 * | 3/2013 | Gossweiler, III ....... | G06F 21/46 713/172 |
| 8,904,479 B1 * | 12/2014 | Johansson ............... | G06F 21/36 382/181 |
| 9,225,531 B2 * | 12/2015 | Hachey .................. | H04L 9/3271 |
| 2006/0075250 A1 * | 4/2006 | Liao .............................. | 713/182 |

(Continued)

FOREIGN PATENT DOCUMENTS

| | | |
|---|---|---|
| CN | 101828162 A | 9/2010 |
| CN | 101986251 A | 3/2011 |

OTHER PUBLICATIONS

International Search Report, dated Jan. 31, 2013, for corresponding International Application No. PCT/CN2012/083217, 6 pages.

*Primary Examiner* — Jason Olson
*Assistant Examiner* — Deeprose Subedi
(74) *Attorney, Agent, or Firm* — Seed IP Law Group PLLC

(57) ABSTRACT

The present invention provides a method and a system for unlocking a device having a touch screen. The method comprises the steps of: a client of the device obtaining a pattern of a logo from a network side; the client of the device monitoring an input of the touch screen; if the monitored input of the touch screen is matched with the pattern of the logo, the client of the device unlocking the device; and the client of the device obtaining updates of the pattern of the logo from the network side at a predetermined time.

9 Claims, 4 Drawing Sheets

The "swoosh" is a registered trademark of Nike, Inc.

(56) References Cited

U.S. PATENT DOCUMENTS

| | | | |
|---|---|---|---|
| 2007/0051813 A1* | 3/2007 | Kiuchi et al. | 235/462.1 |
| 2010/0218249 A1* | 8/2010 | Wilson | H04L 9/3226 726/19 |
| 2010/0321304 A1* | 12/2010 | Rofougaran | G06F 3/046 345/173 |
| 2011/0187497 A1* | 8/2011 | Chin | H04L 9/32 340/5.54 |
| 2011/0314107 A1* | 12/2011 | Garcia | 709/206 |
| 2012/0116973 A1* | 5/2012 | Klein et al. | 705/44 |
| 2013/0018791 A1* | 1/2013 | Mendicino et al. | 705/44 |
| 2013/0234971 A1* | 9/2013 | Li | G06F 3/04883 345/173 |
| 2014/0075512 A1* | 3/2014 | Vargas | G06F 21/46 726/4 |
| 2014/0189819 A1* | 7/2014 | Grimaud | G06F 21/36 726/5 |

* cited by examiner

The "swoosh" is a registered trademark of Nike, Inc.

The "swoosh" is a registered trademark of Nike, Inc.

METHOD AND SYSTEM FOR UNLOCKING A DEVICE HAVING A TOUCH SCREEN

TECHNICAL FIELD

The present invention relates to a method and system for unlocking a device, and in particular, to a method and system for unlocking a device having a touch screen.

BACKGROUND

With the popularization of a device such as a handset and a tablet computer, a touch screen has been widely applied. Since the device may be often placed by the user in his/her pocket, backpack and bag, the touch screen of the device may often come into touch with other objects. On one hand, such touch may lead to unexpectedly triggering functions of a mobile device, e.g., inadvertently making the device power on or power off, or call to others. On the other hand, unexpected touch may cause the device to stay in use for a long time, thereby consuming energy of the device and shortening the device's standby time.

U.S. patent application Ser. No. 10/950,088 discloses a method for locking a touch screen. The method includes receiving a pattern inputted by a user touching the touch screen; judging if the retrieved pattern matches with a specific pattern; checking a status of the touch screen, and issuing a corresponding command according to the checked status if the retrieved pattern matches with the specific pattern; and executing a lock/unlock function according to the corresponding command. The technique disclosed in this patent is subject to the following constrains: the specific pattern has to be a closed curve; a criteria for judging the closed curve is at least one pixel has been sensed more than once, and a trajectory of the user input has to be one accomplished in a stroke of a pen and recording is stopped immediately once the pen leaves the touch screen. The above constrains become limitations for applying the currently widely used multi-point touch screen or capacitive touch screen.

On the other hand, the existing approach for network login verification is to employ a randomly generated verification code. Currently, in order to effectively prevent a specific registered user from keeping trying to log in by using a specific program for Brute Force, a verification code formed by random numbers and pictures is commonly used. It is unbreakable for people without basic knowledge of graphics. For example, when a user logs in QQ sites, a picture in a PNG format is used. The picture is formed by random numbers and random capital letters, and each character's position will change upon each refresh. Microsoft's hotmail apply employs a BMP format, which is formed by random numbers, random capital letters, to random interferon, and random positions. However, in the device's screen, a size of a verification code picture to be displayed is small due to the limitation of the screen's size. Under the influence of random interferon, users may not see random numbers or random letters clearly. Meanwhile, a process for entering random numbers or random letters on a touch screen is complicated, as the user needs to operate entering of letters and numbers on a soft keyboard while having to constantly switching between alphabetic and numeric input modes. The above process is actually to implement the traditional keyboard operation mode by using the soft keyboard function of the touch screen. At present, there is no application of touch trace in web login verification.

On the other hand, the device's screen unlock is the initial entry of the user experience, which has commercial value of advertising introduction. However, there is no solution for achieving the commercial value by utilizing screen unlock in the prior art.

The present invention comprehensively solves the above problems and shortcomings in the prior art.

SUMMARY

An object of the present invention is to provide a method and a system for unlocking a device having a touch screen, which can utilize an input on the touch screen to unlock the touch screen or activate specific functions of the device. On one hand, the system provides a convenient method for screen unlock of a device having a touch screen. On the other hand, by applying touch recognition and pattern comparison, the system may achieve a function of a verification code, so that a touch screen of multi-point recognition can combine existing operations of the device better. Moreover, the present invention proposes a solution for achieving the commercial values by utilizing screen unlock.

According to an aspect of the present invention, there is provided a method for unlocking a device having a touch screen. The method comprises the steps of: a client of the device obtaining a pattern of a logo from a network side; the client of the device monitoring an input of the touch screen; if the monitored input of the touch screen is matched with the pattern of the logo, the client of the device unlocking the device; and the client of the device obtaining updates of the pattern of the logo from the network side at a predetermined time.

Preferably, the client of the device presets a region on the touch screen for receiving sensing of the touch screen.

Preferably, the client of the device identifies a shape included in the pattern of the logo and creates trace points based on the identified shape.

Preferably, the sensing of the touch screen is received within a predetermined time at least once within a preset range around a predetermined percent of trace points.

Preferably, within a predetermined time, the sensitivity of the touch screen received outside a preset range around all the trace points is lower than a preset threshold.

Preferably, the pattern and the trace points are displayed in a background of the preset region for receiving the sensing of the touch screen.

According to another aspect of the present invention, there is provided a method for receiving and checking a verification code for a device having a touch screen. The method comprises the steps of: a client of the device obtaining a pattern of the verification code from a network side; the client of the device monitoring an input of the touch screen; if the monitored input of the touch screen is matched with the pattern of the verification code, the client of the device allowing a user to log in; and the client of the device obtaining updates of the pattern of the verification code from the network side at each re-login.

According to yet another aspect of the present invention there is provided a system for unlocking a device having a touch screen. The system comprises a communication module, a parsing module, a trace point management module, a touch screen input checking module, and an execution module. The communication module is configured to communicate with an external network through the device and receive updates of a pattern of a logo. The parsing module is configured to communicate with the communication module and the trace point management module, receive the pattern of the logo from the communication module, parse the pattern of the logo, and obtain a contour and a shape of the pattern. The trace point management module is configured to communicate with the parsing module, obtain a boundary and the shape, and create trace points based on the shape. The touch screen input checking module is configured to communicate with the trace point management module and hardware of the device, and compare positions of inputs on the touch careen with positions of the trace points. The execution module is configured to communicate with the touch screen input checking module and output a corresponding operation command based on a result of the checking.

DETAILED DESCRIPTION OF THE EMBODIMENTS

Figure 1:
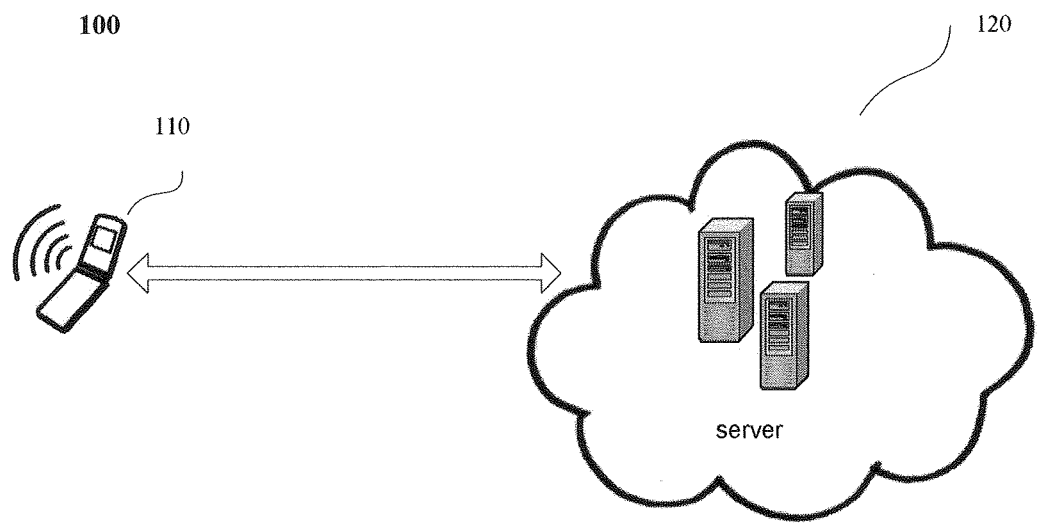
FIG. 1 shows a block diagram of an embodiment of a system for unlocking a device having a touch screen according to the present invention.

FIG. 1 shows a block diagram of an embodiment according to the present invention. The system includes a client 110 and a server 120. Communications between the client 110 and the server 120 may be implemented through 2G or 3G cellular mobile communication techniques, e.g., including, but not limited to, GPRS, CDMA1X, WCDMA, etc.

Figure 2:
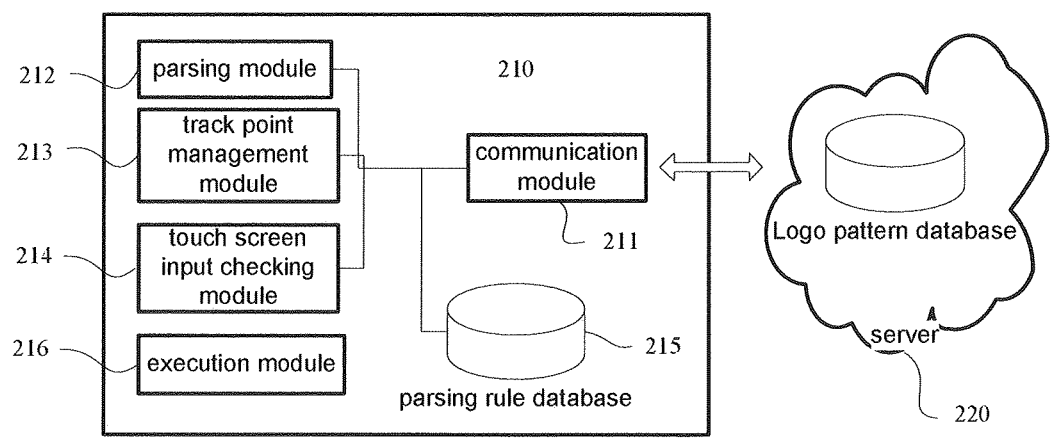
FIG. 2 shows a systematic diagram of an embodiment of the system for unlocking a device having a touch screen according to the present invention as shown in FIG. 1.

FIG. 2 is a systematic diagram of an embodiment of a system for unlocking a device having a touch screen according to the present invention. The system includes a client 210 and a server 220. The server 220 may be a personal computer or a business server computer, and may allow the user to access through a specific network interface via TCP-IP protocol. The server 220 includes a logo pattern database. The logo pattern database may store a logo pattern library preset by a service provider. All logo patterns are set in a predetermined format and size, for facilitating displaying or processing at the user side.

The client 210 includes a communication module 211, a parsing module 212, a track point management module 213, a touch screen input checking module 214, a parsing rule database 215, and an execution module 216. The communication module 211 may control a network interface of the device to communicate with the server and receive updates of a pattern of a logo from the server. The parsing module 212 may communicate with the communication module 211, the track point management module 213 and the parsing rule database 215. The parsing module 212 may receive the pattern of the logo from the communication module 211, parse the pattern of the logo, and obtain a contour and a shape of the pattern.

According to an implementation of the present invention, the parsing process firstly determines a boundary of the pattern of the logo. The determination of the boundary may be implemented by determining a junction between the pattern and a background based on color, brightness or gradation of the pattern. After determining the boundary of the pattern, the pattern may be further exploded into a standard shape, such as circle, rectangle, parallelogram, circular ring, triangle, etc, based on parsing rules stored in the parsing rule database 215.

The track point management module 213 communicates with the parsing module 212 and the parsing rule database 215, obtains a boundary and a shape, and creates trace points based on the shape. According to an implementation of the present invention, following rules stored in the parsing rule database 215, the trace points may be created further based on the standard shape. For example, trace points of a circular ring may be created on a central curve of the circular ring, and trace points of a circle may be created on a circumference of the circle. Subsequently, trace points of respective standard shapes are further combined.

The touch screen input checking module 214 communicates with the track point management module 213 and hardware of the device, and compares positions of inputs on the touch screen with positions of the trace points. According to an implementation of the present invention, the comparison includes judging, within a predetermined time, whether sensing of the touch screen is received at least once within a preset range around a predetermined percent of trace points. The predetermined percent of trace points may be 90%, 80%, or the other percent of all trace points, and it aims to set an appropriate redundancy for user inputs. The preset range is 20 pixels, 30 pixels, or the other sizes and ranges around the track points, and it aims to set an appropriate redundancy for user inputs. The comparison may also include judging, within a predetermined time, whether sensing of the touch screen, which is received outside a preset range around all the trace points, is lower than a preset threshold. The preset threshold may be 5%, 10%, or the other numerical percent, and it aims to allow errors of user inputs while eliminating possibility of unlocking the touch screen unexpectedly.

The execution module 216 communicates with the touch screen input checking module 214, and outputs a corresponding operation command based on a result of the checking. The operation command may be either a command for screen unlock, or a command for activating specific functions of the device, e.g., making a call, sending a short message, connecting to the network and so on. It is also possible to activate software functions installed by the device, such as logging into an email inbox or logging into a micro-blog and so on.

According to an implementation of the present invention, the parsing module 212, the trace point management module 213 and the parsing rule database 215 may be deployed at the server 220. In this case, parsing the pattern of the logo will be completed by the server 220. The server 220 transfers trace points, which are generated by parsing, as well as the pattern of the logo to the client 210. Then, the client 210 may only need to check inputs of the touch screen.

Figure 3:
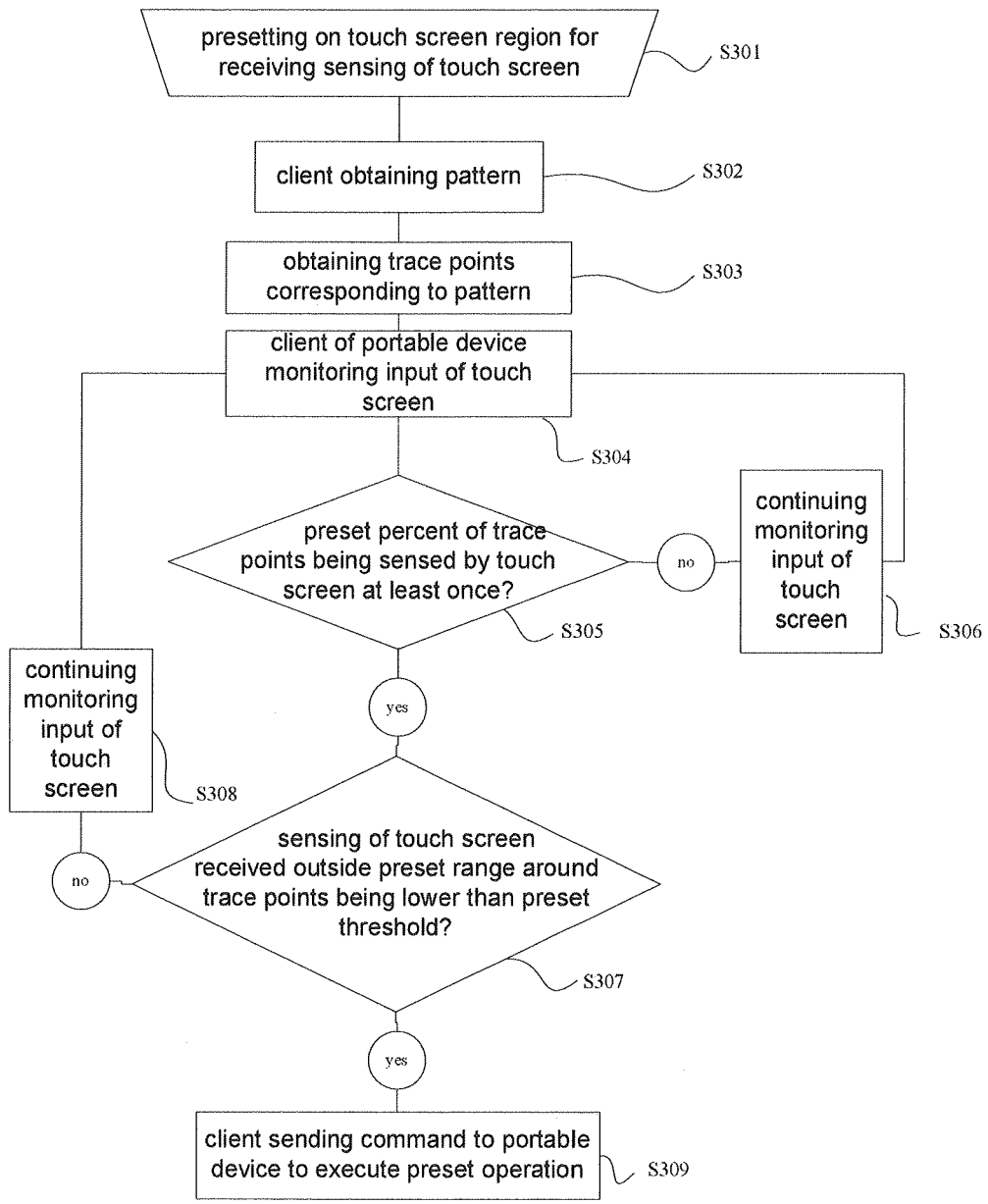
FIG. 3 shows a flow chart of a method for unlocking a device having a touch screen according to the present invention.

FIG. 3 shows a flow chart of an embodiment of a method for unlocking a device having a touch screen according to the present invention. The method for unlocking the device having the touch screen starts at step S301, where a region for receiving sensing of the touch screen is preset on the touch screen. According to an implementation of the present invention, three regions may be preset on the touch screen. The first region is used to display the current pattern of the logo. The second region is used to receive sensing of the touch screen. The third region is used to provide a button for screen unlock. Once the user clicks the button for screen unlock, the pattern of the logon may be displayed and a program for screen unlock may be activated.

At step S302, the client obtains the pattern of the logo. According to an implementation of the present invention, the client may regularly obtain updates of the pattern of the logo from the server.

At step S303, the client obtains trace points corresponding to the pattern. According to an implementation of the present invention, the parsing process firstly determines a boundary of the pattern of the logo. The determination of the boundary may be performed by determining a junction between the pattern and a background based on color, brightness or gradation of the pattern. After determining the boundary of the pattern, the pattern may be further exploded into a standard shape, such as circle, rectangle, parallelogram, circular ring, triangle, etc, based on parsing rules stored in the parsing rule database. Following rules stored in the parsing rule database, the trace points may be created further based on a standard shape. For example, trace points of a circular ring may be created on a central curve of the circular ring, and trace points of a circle may be created on a circumference of the circle. Subsequently, trace points of respective standard shapes are further combined.

At step S304, the client of the device monitors an input of the touch screen. At step S305, the client judges, within a predetermined time, whether a preset percent of trace points are all sensed by the touch screen at least once. According to an implementation of the present invention, the client judges whether a predetermined range around the trace points is sensed by the touch screen at least once. As the user input may slightly deviate from a predetermined trace, or a recognition function of the screen may lead to a deviation between an input position and a recognition position, it is needed to set a threshold for the judging. If not all the trace points are sensed by the touch screen at least once, at step S306, the method continues to monitor an input of the touch screen. If all the trace points are sensed by the touch screen at least once, at step S307, the method proceeds to judge, within a predetermined time, whether the sensing of the touch screen, which is received outside a preset range around the trace points, is lower than a preset threshold. As a large screen multi-touch smart phone has been widely used, when the user puts a smart phone in his or her pocket or bag, it is easy for the user to casually click a screen several times within a short time period. Therefore, in order to prevent the touch screen from recognizing a large-scale casual click as an unlocking operation, it is needed to set a condition to limit casual clicks outside a range of trace points. If the number of casual clicks exceeds a preset threshold, at step S308, the method continues to monitor an input of the touch screen.

According to an implementation of the present invention, the client may provide the user with a prompt, such as "the input is incorrect, please re-enter."

According to an implementation of the present invention, grids are divided according to the pattern. The grid may be arranged in 16×16, including 256 nodes. It will be appreciated that other number of nodes, such as 100 or more, may be applied, depending on complexity of the pattern of the logo or requirements of program capability. The created trace points may take values on the closest nodes, and the preset range may include one, two, or more grids around the nodes. On basis of this, if a user input is located outside a predetermined grid, the user input may be determined to be outside the preset range.

If the number of casual clicks is lower than a preset threshold, at step S309, the client sends a command to the device to execute a preset operation. The operation command may be either a command for screen unlocking, or a command for activating specific functions of the device, such as making a call, sending a short message, connecting to the network and so on. It is also possible to activate software functions installed by the device, such as logging into an email inbox or logging into a micro-blog and so on.

Figure 4:
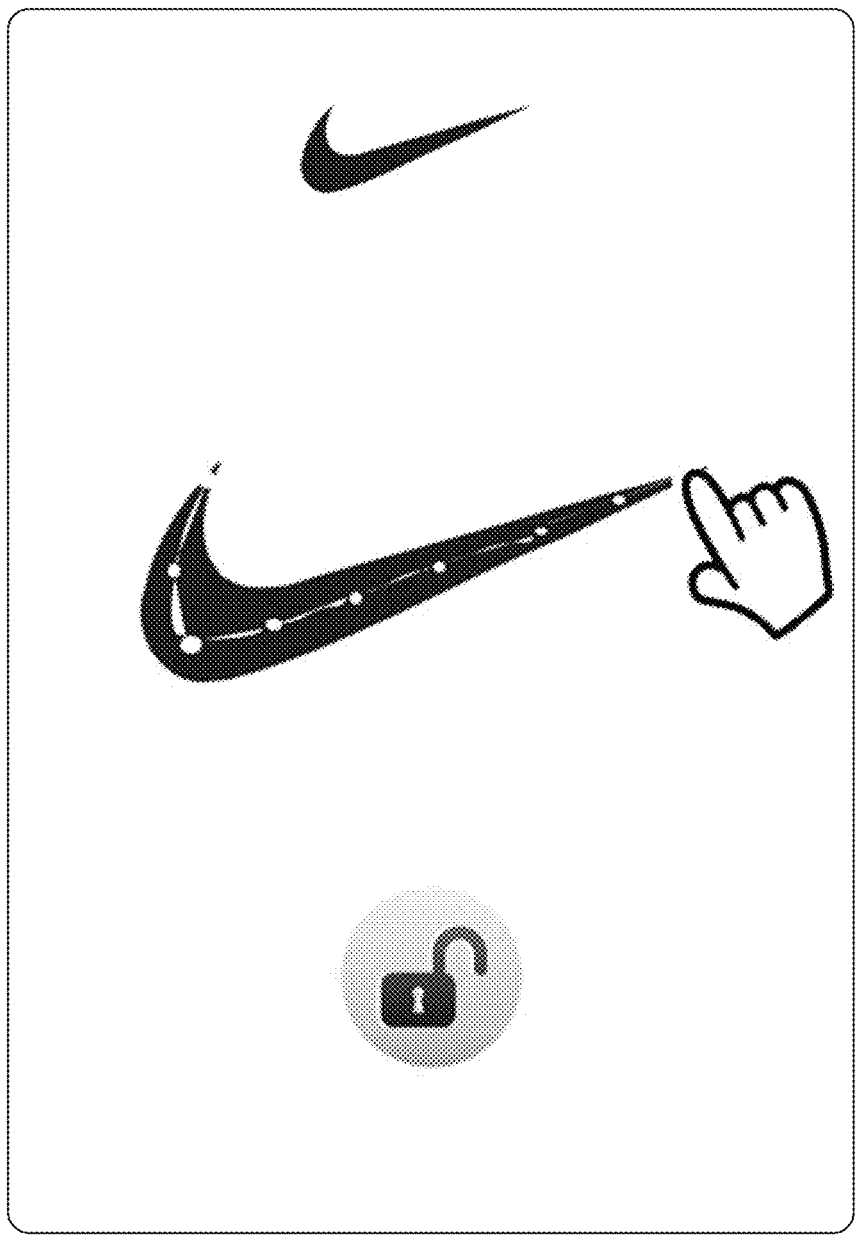
FIG. 4 shows an operation interface of an embodiment of a method for unlocking a device having a touch screen according to the present invention.

FIG. 4 shows an operation interface of an embodiment of a method for unlocking a device having a touch screen according to the present invention. The frame is a boundary of the touch screen. A hook logo displayed in the upper of FIG. 4 is a pattern of a logo. In the middle of FIG. 4, it shows a user input recognition box. In the bottom of FIG. 4, it illustrates an unlock button. The user may firstly click the unlock button to activate an unlocking mode and procedure.

Figure 5:
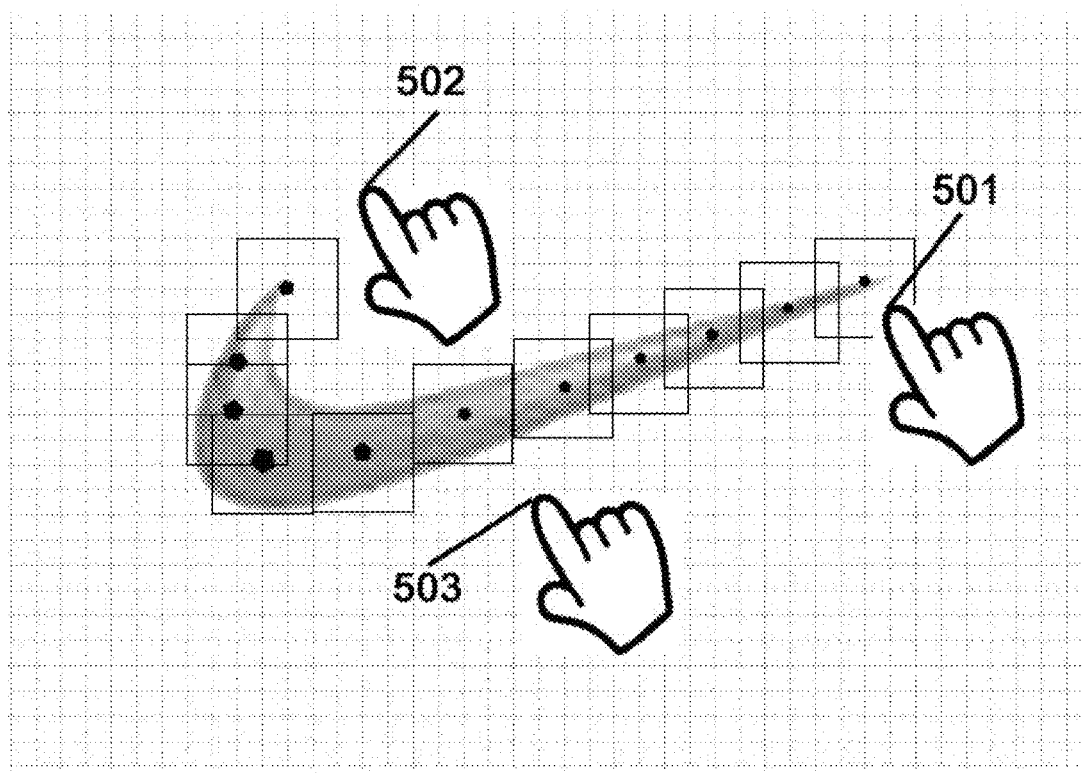
FIG. 5 shows a schematic diagram of an embodiment of a method for unlocking a device having a touch screen according to the present invention.

FIG. 5 shows a schematic diagram of an embodiment of a method for unlocking a device having a touch screen according to the present invention. FIG. 5 is divided into grid vertically and horizontally. As illustrated, a lot of trace points (denoted as block dots in FIG. 5) are created on nodes. As shown in the black box of FIG. 5, a preset range is predefined as a range of two grids around the nodes. A screen input position denoted by 501 is within a preset range of related trace points. Screen input positions denoted by 502 and 503 are outside a preset range of all the trace points.

According to an implementation of the present invention, there is provided a method for a device having a touch screen to receive and check a verification code. The method comprises the steps of: a client of the device obtaining a pattern of the verification code from a network side; the client of the device monitoring an input of the touch screen; if the monitored input of the touch screen is matched with the pattern of the verification code, the client of the device allowing a user to log in; and the client of the device obtaining updates of the pattern of the verification code from the network side at each re-login.

The above mentioned and described embodiments are employed herein to illustrate the principles and the effect of the present invention, other than limiting the present invention. It will be appreciated by the person of skill in the art that various modifications may be made to the above described embodiments without departing from the scope of the present invention. Therefore, the scope of the present invention should be defined in the claims.

What is claimed is:

1. A method for unlocking a device having a touch screen, the method comprising the steps of:
   a client of the device obtaining a pattern of a logo from a network side, the client residing on the device;
   the client of the device monitoring an input of the touch screen;
   the client of the device determining whether the monitored input of the touch screen is matched with the pattern of the logo;
   if the monitored input of the touch screen is matched with the pattern of the logo, the client of the device unlocking the device; and
   the client of the device obtaining updates of the pattern of the logo from the network side at a predetermined time, and displaying the updates of the pattern of the logo on the touch screen of the device.

2. The method for unlocking the device having the touch screen according to claim 1, further comprising: the client of the device presetting a region on the touch screen for receiving sensing of the touch screen, the region including part or entire of the touch screen.

3. The method for unlocking the device having the touch screen according to claim 1, further comprising: the client of the device identifying a shape included in the pattern of the logo and creating trace points based on the identified shape.

4. The method for unlocking the device having the touch screen according to claim 3, further comprising:
   receiving, within a predetermined time, the sensing of the touch screen at least once within a preset range around a predetermined percent of trace points among all the trace points.

5. The method for unlocking the device having the touch screen according to claim 3, wherein within a predetermined time, the sensitivity of the touch screen received outside a preset range around all the trace points is lower than a preset threshold.

6. The method for unlocking the device having the touch screen according to claim 2, wherein the pattern and the trace points are displayed in a background of the preset region for receiving the sensing of the touch screen.

7. A system for unlocking a device having a touch screen, comprising a communication module, a parsing module, a trace point management module, a touch screen input checking module, and an execution module,
   the communication module is configured to communicate with an external network through the device and receive updates of a pattern of a logo;
   the parsing module is configured to communicate with the communication module and the trace point management module, receive the pattern of the logo from the communication module, parse the pattern of the logo, and obtain a contour and a shape of the pattern;
   the trace point management module is configured to communicate with the parsing module, obtain a boundary and a shape, and create trace points based on the shape;
   the touch screen input checking module is configured to communicate with the trace point management module and hardware of the device, and compare a position of an input on the touch screen with positions of the trace points; and
   the execution module is configured to communicate with the touch screen input checking module and output corresponding operation instructions based on a result of the checking.

8. The system for unlocking the device having the touch screen according to claim 7, wherein, the touch screen input checking module is configured to preset on the touch screen a region for receiving sensing of the touch screen, the region including part or entire of the touch screen.

9. The system for unlocking the device having the touch screen according to claim 7, wherein, the touch screen input checking module is configured to judge whether the sensing of the touch screen is received, within a predetermined time, at least once within a preset range around a preset percent of trace points among all the trace points.

* * * * *